Nov. 25, 1969         T. O. WENTWORTH ET AL         3,480,407
        MULTIPLE ZONE APPARATUS FOR THE PROCESSING OF FLUIDS HAVING
              INTERZONE FLUID MIXING AND REDISTRIBUTION FEATURES
Filed Feb. 2, 1967                                 2 Sheets-Sheet 1

INVENTORS.
THEODORE O. WENTWORTH
CLYDE G. ANDERSON
BY
McLean, Morton and Boustead

ATTORNEYS

United States Patent Office 3,480,407
Patented Nov. 25, 1969

3,480,407
MULTIPLE ZONE APPARATUS FOR THE PROCESSING OF FLUIDS HAVING INTERZONE FLUID MIXING AND REDISTRIBUTION FEATURES
Theodore O. Wentworth and Clyde G. Anderson, Cincinnati, Ohio, assignors to Vulcan-Cincinnati, Inc., Cincinnati, Ohio, a corporation of Ohio
Filed Feb. 2, 1967, Ser. No. 613,565
Int. Cl. B01j 9/00, 1/30; C07c 1/04
U.S. Cl. 23—288          6 Claims

ABSTRACT OF THE DISCLOSURE

The invention disclosed relates to an apparatus for the processing of fluids in a series of zones adapted to receive additional fluid in the interzone space, mix that fluid with partially processed fluid from the preceding zone in a two-step mixing operation and redistribute the fluid to the succeeding zone. A gas phase multi-zone catalytic reactor for the production of methanol from carbon monoxide and hydrogen is specifically shown. The reactor, designed for close temperature control, is provided with special ports for the introduction of fresh gases into the interzone space, a baffle in this space to provide further mixing of the fresh gases and partially reacted gases from the preceding catalyst zone, and a series of two distribution plates for redistributing the thoroughly mixed gases into the succeeding catalyst zone.

---

This invention relates to an apparatus for processing fluids in a series of zones wherein close control over fluid temperature or composition is desired. More specifically, it relates to an apparatus wherein fresh supplementary fluid is added to partially processed fluid in the interzone spaces in order to control the temperature or the composition of the mixture in the next processing zone. The apparatus further provides novel mixing features for the fresh and partially processed fluids and means for redistributing the mixed fluids to the next processing zone.

Although the apparatus may be used in any multi-zone application wherein mixing and redistribution are required, it is particularly well adapted to carry out gas phase catalytic reactions in a series of catalyst zones or beds where extremely close temperature control is desired. The discussion hereinafter is directed toward such an application, but this is for ease of description only and shall in no way limit the scope of the invention.

In the process for the production of methanol from carbon monoxide and hydrogen, for example, it is essential to control the temperature in the reaction zone within a narrow range in order to both maximize the yield of product from raw material and minimize the production of undesirable by-products. The reaction is considerably exothermic, however, and causes a large temperature rise in the resulting gases unless steps are taken to avoid it. One method employed by the prior art to control the temperature rise in the catalyst zone was the addition of a substantial excess of hydrogen to the reaction mixture as a heat ballast. The increased reactor and catalyst volume and compression facilities which the scheme engendered made the overall process uneconomic.

The concept of carrying out the reaction in a vertically positioned series of catalyst zones or beds with interzone cooling provided by the addition of cool, supplementary reactant gases is known. By reacting only a portion of the gas mixture in each zone, the temperature rise could be limited; the addition of a controlled quantity of cool reactant gases to the effluent from each zone would return the temperature to the optimum for feed to the next zone. Additionally, an integral feed-effluent exchanger provided temperature control over the feed to the first reaction zone as well as overall thermal efficiency.

A very substantial improvement in the step-wise reaction vessel was disclosed in U.S. Patent No. 3,254,967 to Wentworth. A circumferential manifold for the supplementary gases was provided in the interzone space and provided with a plurality of holes through which the gases could flow. Located directly below the holes was a baffle plate normal to the flow of the partially reacted gases passing to the next catalyst zone and provided with a plurality of notches at its circumference located opposite to the holes in the circumferential manifold. The fresh and partially reacted gases mixed in the baffle notches and passed below the baffle plate to the next catalyst zone. Although the unique advance hereinafter disclosed may be used in any reactor application wherein gas mixing and redistribution between reaction zones are the desiderata, reference is specifically made to U.S. Patent No. 3,254,967 since the unique advance may be incorporated with ease in the reactors disclosed therein.

Although the improved reaction vessel shown in the above patent provides generally good mixing and distribution of the gas streams between zones, it is not wholly satisfactory in some respects. In larger diameter reaction vessels particularly, but in smaller ones as well, temperature differentials occur in the plane normal to the path of flow of the gases through the beds. This may occur for several commonplace reasons; for example catalyst in one part of the bed may be more active than in another or conversely become deactivated by poisons in the reaction gases; or non-uniformities in the composition of the reacting gases across the bed may occur causing local areas of higher and lower reaction rate; or the catalyst packing density may vary across the bed causing local "hot" or "cold" spots. Addition of fresh cool gases may reduce the temperature differentials in the main processing stream but will not totally remove them. Unless these temperature differentials are removed prior to introduction of the mixed gases into the next zone, they will reduce the efficiency of the reactor performance, give misleading temperature readings and perhaps even augment themselves in the next zone. The combination of circumferential manifold and notched baffle adequately mixes the fresh gas with the partially reacted gases but does not mix the entire stream in order to remove temperature differentials created in the preceding bed of catalyst.

Another problem encountered is in the distribution of the mixed gases to the succeeding catalyst bed. In order to achieve a uniform flow rate across the plane normal to the path of flow, it is necessary to provide a distribution plate atop the succeeding catalyst bed whose perforations are of such quantity and size as achieve a relatively large pressure drop and gas velocity through the distribution plate. The high velocity of the gases entering the succeeding catalyst bed causes physical damage to the catalyst particles and attrition of them. Distribution plates having a relatively large number of large holes, however, do not provide satisfactory distribution; channeling and non-uniform flow result.

It is thus an object of the invention to provide a means for mixing in the interzone space, the supplementary gas with the partially reacted gases from the preceding catalyst zone.

It is a further object of the invention to provide means for mixing the entire stream of gas passing through the interzone space with itself in order to equalize the temperature throughout.

It is still a further object of the invention to provide means whereby the mixed gases can be evenly distributed into the succeeding catalyst zone while avoiding damage to the catalyst particles themselves.

These and other objects are achieved by means of a novel gas mixing and redistribution apparatus which comprises in the interzone space two baffle plates normal to the path of flow of gases leaving a catalyst zone which baffle plates define a mixing chamber, a circumferential manifold with ports corresponding to circumferential ports in the mixing chamber for the introduction of supplementary gases, mixing means in the chamber, and a series of two gas distribution plates normal to the path of flow of gases, the first of which is adapted to produce a relatively high gas velocity and pressure drop and achieve thereby good distribution of gases leaving the mixing chamber across the plate and the second of which is located above the succeeding catalyst zone and is adapted to produce a relatively low gas velocity and pressure drop so that attrition of the catalyst particles does not occur.

For a more complete understanding of the nature of the present invention, reference is made to the accompanying drawings which illustrate an embodiment falling within the scope of the invention. For convenience, a portion of the multi-zone catalytic reactor in U.S. Patent No. 3,254,967 is shown but it will be realized that the novel features of the invention may be incorporated in any multizone fluid processing vessel.

Figure 2:
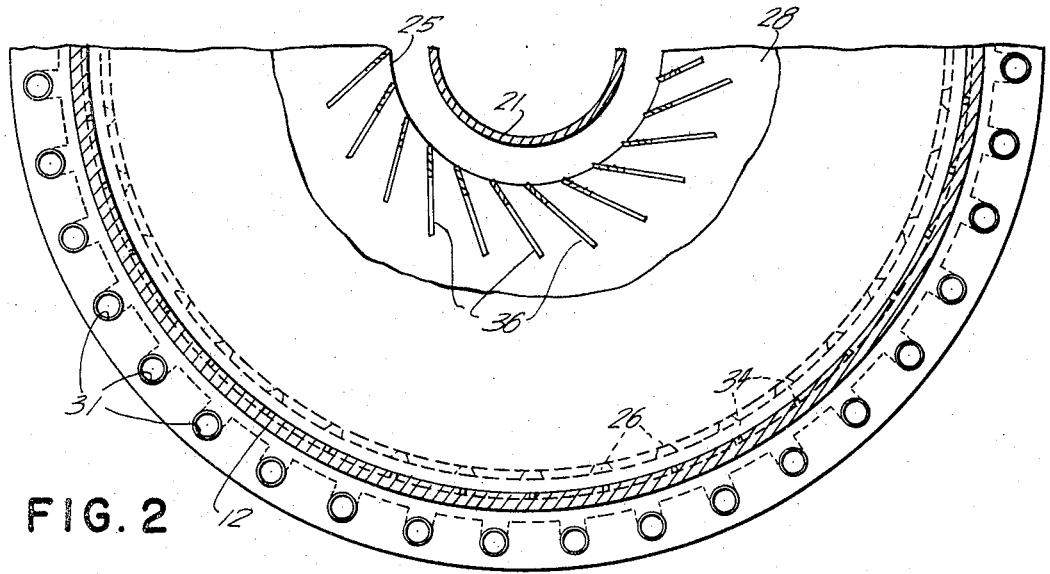
FIG. 2 is a top view of the interzone section.
Figure 1:
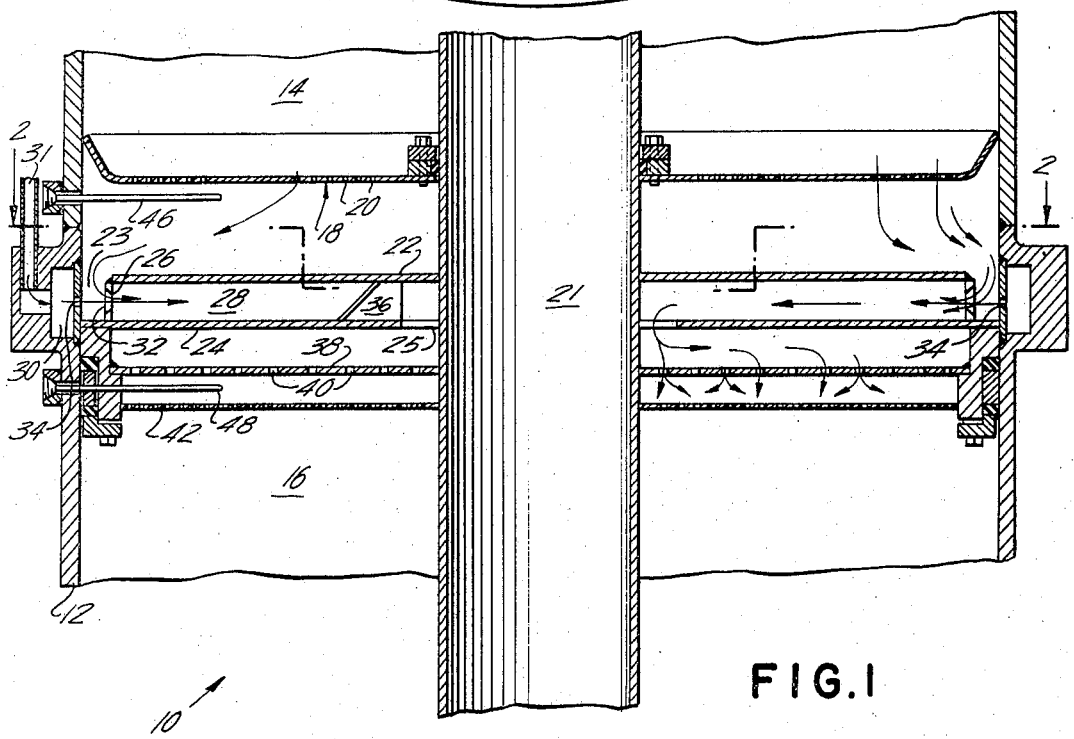
FIG. 1 is an elevation of an interzone section of a multi-zone catalytic reactor.
Figure 3:
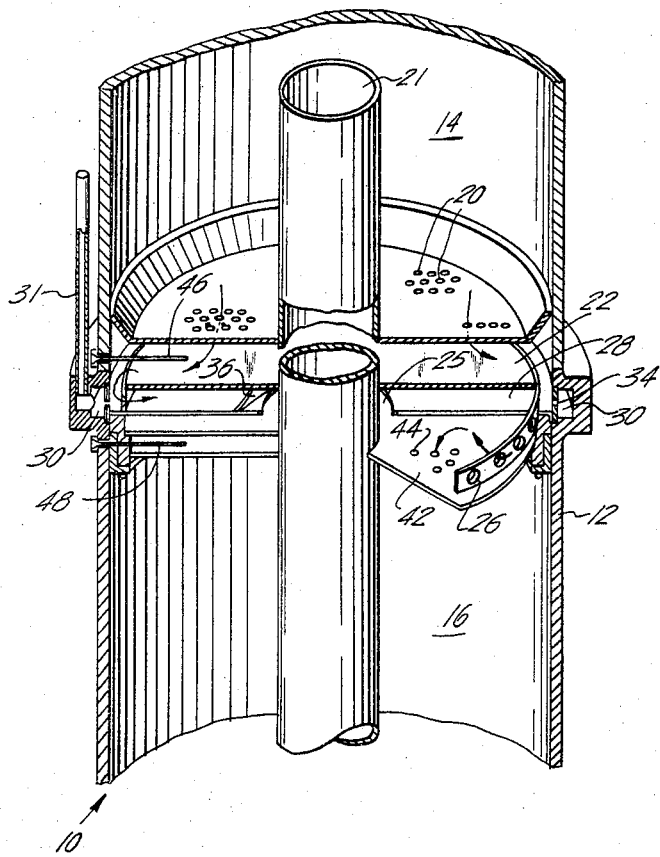
FIG. 3 is an isometric view of the interzone section.

Referring now to the drawings, a vertical multi-zone catalytic reactor 10 is constructed of an outer shell 12 which encloses catalyst zones 14 and 16. Each of these zones contains a bed of conventional zinc oxide-chromium oxide methanol synthesis catalyst having a particle size of about 6.25 mm. The catalyst is supported on support plate 18 having perforations 20 to permit passage of the gases from the catalyst bed into the interzone space with minimum pressure drop. An axially positioned conduit 21 carries the main gas feed shown to the uppermost catalyst bed. A circular baffle plate 22, smaller in diameter than the vessel, is located below support plate 18 normal to the path of flow of gases leaving the catalyst zone. It is concentrically located in the interzone space and defines an annular clearance 23 with cylindrical outer shell 12 through which the gases are constrained to flow. An annular baffle plate 24, equal in diameter with the vessel, is located below circular baffle 22 and is affixed to vessel wall 12. The inner diameter of annular baffle plate 24 is somewhat larger than that of axial conduit 21 and defines an annular clearance 25 through which the gases, which are mixed as hereinafter described, flow. A vertically positioned ring 26 connects the outer circumference of circular baffle plate 22 with annular baffle plate 24 defining thereby a mixing chamber 28. Ring 26 is located opposite to circumferential manifold 30 which carries supplementary gases supplied by pipe 31 for admixture with the stream passing between catalyst zones 14 and 16. Ring 26 has a plurality of ports 32 to permit the gases to pass horizontally into mixing chamber 28. These ports are located opposite holes 34 in manifold 30 through which the supplementary gases pass into the main gas stream entering mixing chamber 28. An advantage of this structure is that the main stream of gases aspirates the supplementary gases into the main stream thereby achieving a good initial mixing. Mixing chamber 28 contains at its inner circumference a plurality of vertically positioned baffle vanes 36 which are further positioned at an angle to the radii of the vessel in order to cause a turbulent circumferential flow of gases in the mixing chamber. It is this flow pattern which not only thoroughly mixes the supplementary gases with the main stream of gases but mixes the entire stream with itself, thereby removing temperature and/or composition differentials. Any mixing device known in the art may be employed in this chamber but the vanes are a particularly preferred device since good mixing is achieved without significant pressure drop. The mixed gases eventually pass downwardly through clearance 25 and onto circular distribution plate 38. This plate is affixed both to vessel wall 12 and axial conduit 21 and contains a plurality of holes 40 which by size and quantity cause the mixed gases to distribute themselves evenly across the plate. The now mixed and distributed gases pass downwardly at high velocity onto a second circular distribution plate 42 located just above catalyst zone 16. The holes 44 are of such size and quantity as will pass the gases into catalyst zone 16 with lowered velocity thereby avoiding physical damage to the catalyst particles. The temperatures in the space beneath catalyst support plate 20 and in the space beneath distribution plate 38 are measured by means of thermocouple elements 46 and 48, respectively.

The following example demonstrates the particular effectiveness of the mixing and distribution apparatus described.

EXAMPLE

A vessel such as that shown in No. 3,254,967 having a diameter of about 7 feet and an overall length of about 55 feet is used in a methanol synthesis process. The vessel contains 5 beds of conventional zinc oxide-chromium oxide catalyst and each of the 4 interzone spaces includes the novel mixing and distribution apparatus shown above.

About 900 pounds per hour of synthesis gas per 100 pounds of methanol produced is fed to the converter. Approximately 75% (675 pounds per hour per 100 pounds of methanol) of the total stream (900 pounds) enters the first catalyst bed at a temperature of 680° F., and a pressure of 5000 p.s.i.a. The synthesis gas has a composition (in percent by volume) of approximately 76% $H_2$, 10% CO, 10% $CH_4$, 3% $CO_2$ and 10% $N_2$. The average temperature of the partially reacted gases leaving the first catalyst bed is about 720° with local variations from this temperature across the support plate being within plus or minus 5° F.

The remaining 275 pounds per hour of synthesis gas (per 100 pounds of methanol produced) are split into four streams of supplementary feed gas which enter the mixing chambers at approximately 130° F. to provide cooling of the partially reacted gases leaving the catalyst beds. The gases are mixed in the mixing chamber and then distributed; the gases leaving the mixing chambers are at about 680° F. and essentially no temperature differentials exist across the paths of flow. The overall pressure drop from the first bed support plate through the second bed distribution plate is approximately 3 p.s.i. and most of this occurs across the first distribution plate.

What is claimed is:

1. In an apparatus for processing fluids comprising an outer shell, a plurality of processing zones in said shell through which fluid passes in series and means for supplying supplementary fluid in the interzone space, the improved interzone fluid mixing and redistribution apparatus which comprises a first baffle means smaller in maximum dimension than the shell positioned concentrically in the shell normal to the path of flow of fluid leaving the preceding processing zone, a second baffle means positioned relative to the flow of fluid leaving the preceding processing zone, downstream of the first, and normal to the path of flow of fluid, said second baffle means being affixed to the shell at its outer periphery and having an opening at its center, a ring connecting the said first baffle means with the said second baffle means defining thereby a chamber between said baffle means, said ring having a plurality of holes about its circumference whereby fluid can pass into the mixing chamber defined by said first and second baffle means, a circumferential manifold for supplying the supplementary fluid located opposite to said ring and having holes positioned opposite to the said holes in the ring through which fluid can flow into admixture with fluid from the preceding processing zone, mixing means in said mixing chamber, distribution means positioned, relative to the flow of fluid leaving the preceding processing zone, downstream of said said baffle means adapted to envenly distribute fluid across said vessel and a second distribution means located before the succeeding processing zone having means adapted to feed fluid at a lowered velocity into said succeeding processing zone.

2. An apparatus as recited in claim 1 wherein said first and second baffle means are baffle plates, the outer periphery of the first baffle plate is connected to the second baffle plate by means of said ring and the mixing means comprises a plurality of vanes positioned between the first and second baffle plates within said mixing chamber adapted to cause turbulent mixing of said fluid.

3. An apparatus are recited in claim 2 wherein said first and second distribution means are distribution plates affixed at their periphery to said shell, the first of said plates having holes adapted to evenly distribute fluid across said plate at a relatively high velocity through said holes, and the second of said plates having holes adapted to distribute fluid at relatively low velocity to said suceeding processing zone.

4. An apparatus as recited in claim 3 wherein the vanes in said mixing chamber are affixed to said first and second baffle plates normal to them and at an angle to the radii of said shell, thereby creating a circumferential turbulent flow of the fluid in said mixing chamber.

5. In an apparatus for conducting a chemical reaction in the gaseous phase comprising a vertically oriented cylindrical outer shell, a plurality of reaction zones containing catalyst in said shell through which gases pass downwardly in series and means for supplying supplementary gas in the interzone space, the improved interzone gas mixing and redistribution apparatus which comprises a first baffle plate smaller in maximum dimension than the shell positioned concentrically in the shell normal to the path of flow of gas leaving the preceding reaction zone, a second baffle plate positioned below said first baffle plate normal to the path of flow of gas, said second baffle plate being affixed to the shell at its outer periphery and having an opening at its center, a ring connecting the periphery of said first baffle plate with the said second baffle plate, defining thereby a chamber between said baffle plates, said ring having a plurality of holes about its circumference whereby gas can pass into the mixing chamber defined by said first and second baffle plates, a circumferential manifold for supplying the supplementary gas located opposite to said ring and having holes positioned opposite to the said holes in the ring through which gas can flow into admixture with gas from the preceding reaction zone, a plurality of vanes in said mixing chamber affixed to said first and second baffle plates normal to them and at an angle to the radii of said cylindrical shell thereby creating a circumferential turbulent flow in said mixing chamber, a first distribution plate positioned below said second baffle plate having holes adapted to evenly distribute gas across its surface, and a second distribtuion plate located below said first distribution plate and above the succeeding reaction zone having holes adapted to feed gas at lowered velocity into said succeeding reaction zone.

6. In an apparatus for conducting a chemical reaction in the gaseous phase comprising a vertically positioned, cylindrical outer shell, a heat exchanger positioned in the bottom of the shell, a plurality of catalyst beds contained in superimposed catalyst receptacles positioned above said heat exchanger and spaced from the inner wall of said shell to provide an annular space therebetween which communicates with said heat exchanger, the upper and lower limits of each of said catalyst receptacles being defined by upper and lower perforated plates, and the catalyst receptacles being separated by chambers, means for introducing a first stream of gases to be reacted into said annular space between said catalyst receptacles and said shell, from thence upwardly through said heat exchanger, from thence to the uppermost of said catalyst beds, from thence downwardly through said catalyst beds, and from thence downwardly through said heat exchanger in indirect heat exchange relationship with the portion of said first stream of gases passing upwardly through said heat exchanger and out the said apparatus, means for introducing a second stream of gases to be reacted into said first stream of gases after said first stream of gases has passed through said heat exchanger and means for introducing a third stream of gases to be reacted into the gases leaving at least one of said catalyst beds other than the last, the improved mixing and redistribution apparatus comprising a first baffle means smaller in maximum dimension than the cylindrical outer shell positioned concentrically in the shell normal to the path of flow of gas leaving the preceding catalyst bed, a second baffle means positioned below the first and normal to the path of flow of gas, said second baffle means being affixed to the shell at its outer periphery and having an opening at its center, a ring connecting the said first baffle means with the said second baffle means defining thereby a mixing chamber between said baffle means, said ring having a plurality of holes about its circumference whereby gas can pass into the mixing chamber defined by said first and second baffle means, a circumferential manifold for supplying the supplementary gas located opposite to said ring and having holes positioned opposite to the said holes in the ring through which gas can flow into admixture with gas from the preceding catalyst bed, mixing means in said mixing chamber, first distribution means positioned below said second baffle means adapted to evenly distribute gas across the succeeding catalyst bed, and a second distribution means located below said first distribution means and above the succeeding catalyst bed having means adapted to feed gas at lowered velocity into said succeeding catalyst bed.

References Cited

UNITED STATES PATENTS

| | | | |
|---|---|---|---|
| 1,970,923 | 8/1934 | Spalding | 23—176 |
| 2,104,858 | 1/1938 | Ferguson | 23—176 |
| 2,846,291 | 8/1958 | Johannsen et al. | 23—176 |
| 3,254,967 | 6/1966 | Wentworth | 23—288 |

JAMES H. TAYMAN, JR., Primary Examiner

U.S. Cl. X.R.

23—1, 176, 199, 289; 260—449.5; 261—113

UNITED STATES PATENT OFFICE
CERTIFICATE OF CORRECTION

Patent No. 3,480,407          Dated November 25, 1969

Inventor(s) Theodore O. Wentworth and Clyde G. Anderson

It is certified that error appears in the above-identified patent and that said Letters Patent are hereby corrected as shown below:

Column 4, line 37, delete "76%" and insert therefor --67%--.

Column 5, line 7, delete "said" (second occurence) and insert therefor --second--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents